UNITED STATES PATENT OFFICE.

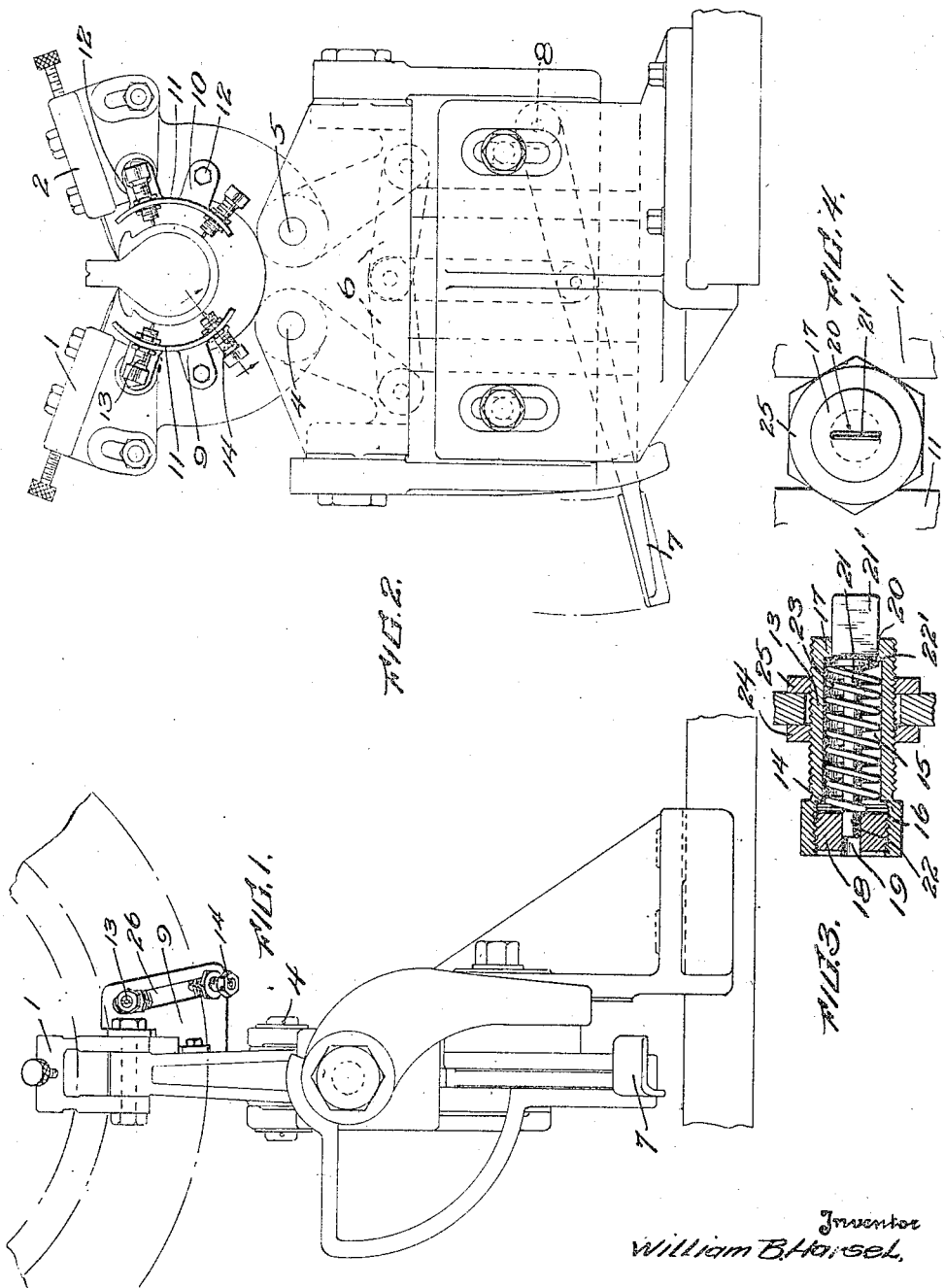

WILLIAM B. HARSEL, OF AKRON, OHIO, ASSIGNOR TO THE GOODYEAR TIRE & RUBBER COMPANY, OF AKRON, OHIO, A CORPORATION OF OHIO.

MARKER FOR TIRES.

1,324,016.     Specification of Letters Patent.     Patented Dec. 2, 1919.

Application filed December 22, 1917. Serial No. 208,428.

*To all whom it may concern:*

Be it known that I, WILLIAM B. HARSEL, a citizen of the United States, residing at Akron, in the county of Summit and State of Ohio, have invented new and useful Improvements in Markers for Tires, of which the following is a specification.

My present invention relates to new and useful improvements in tire carcass making machines, and has for its principal object the provision of a device of the character of a scriber or marker, whereby a mark or plurality of marks are scribed on the carcass at predetermined points.

Another object is to combine the above operation with one of the necessary operations essential to the building of a carcass, thereby relieving the operator from the performance of an excess number of steps.

A still further object therefor is to provide an apparatus automatic in action and at the same time capable of convenient and speedy adjustment to overcome any difficulties that may arise.

The above and additional objects of a similar nature, which will be hereinafter more specifically treated, may be accomplished by such means as are illustrated in the accompanying drawings, described in the following specification, and then more particularly pointed out in the claims which are appended hereto and form a part of this application.

With reference to the drawing, wherein there has been illustrated a preferred embodiment of the invention as it is reduced to practice, and throughout the several views of which, similar reference numbers designate corresponding part:

Figure 1 is a front elevation of my device as applied to a foot actuated trimming knife, the carcass being shown in dotted lines;

Fig. 2 is a side elevation;

Fig. 3 is a vertical section of one of the marking elements; and

Fig. 4 is an end view of same.

In applying my device to a tire building machine, I have in the embodiment herein disclosed applied it to a set of foot operated trimming knives indicated in the drawings with light lines.

This trimming mechanism is suitably mounted upon the main frame of the machine with its central axis located radially with respect to the core and preferably in line with the vertical axis of the core to allow the forces of gravity to return the trimmers to their inoperative position.

The trimming knives 1 and 2 are pivotally connected to the knife carrying frame 3 by pivots 4 and 5 and connected by suitable link connections 6 to the foot pedal 7, which is pivoted also to the frame by the pivot 8.

From the foregoing it will be seen that any downward pressure of the lever 7 will cause the knife units 1 and 2 to be brought into engagement with the tire carcass at the proper point, and a further pressure of the lever 7 will cause the knives to sever the fabric as required.

Mounted on the trimming knives is a pair of segmental castings 9 and 10, consisting of a body portion 11 and two projecting lugs 12 adapted to be bolted to the knives 1 and 2 respectively. These castings are mounted in the correct relation in respect to the ring core and tire carcass thereon, so that when the knives are brought into the cutting position the marker units 13 will be brought into contact with the outer layer of the carcass, as will be more readily understood.

In Fig. 3 will be seen a vertical section of one of these marker units 13 which consists of a cylindrical portion 14, with an interior chamber 15, an enlarged extremity 16 and an inclosed end 17, a stylus 21 and locking means 24 and 25 for securing the marker to the castings 9 and 10.

The enlarged portion of the cylinder 14 is internally screw threaded and adapted to receive a screw threaded plug 18, having a centrally located bore 19. The closed end portion 17 has a centrally cut slot 20 adapted to receive a wedge shaped end portion 21' of the stylus 21.

The body portion of the stylus 21 consists of a cylindrical shaped rod 22, centrally located within the bore 15 of the cylinder 14, and is slidably mounted at one end in the aperture 19 of the plug 18.

Between the wedge-shaped end portion 21' of the stylus 21 and the body portion 22 is an annular flange 22' adapted to bear against the inner surface of the end wall 17, the result of which will be apparent.

To retain the stylus in an extended position, a suitable spring 23 is mounted inside the cylinder surrounding the body portion 22 and adapted to abut against the inner surface of the plug 18 and the flange 22'.

The marker units 13 respectively are mounted in adjusting slots 26 in the castings 9 and 10 by clamp nuts 24 and 25 which encircle the body portion of the cylinder 14 and clamp the opposite sides of the castings between them.

The operation of my device is as follows: Assuming that the carcass has been built up to the required size and number of plies, the next operation would be to trim off the excess fabric below the toe of the bead. The operator would put his foot on the pedal 7 thereby causing the knives to engage the fabric and trim same. The marking elements 13 would also be brought into engagement with the side walls of the carcass and upon revolving the core would score the surface of the outer ply sufficiently to guide the tire finisher to apply his finishing strips at the correct places. The operator upon removing his foot from the lever 7 will release the trimming knives and markers out of engagement and allow them to assume their idle position.

It will be readily seen that as the trimming knives wear down from constant use, the spring actuated stylus will retard sufficiently so as not to bruise or cut the carcass, thereby defeating the purpose of this invention.

What I claim is:

1. In a tire carcass building machine, a power driven ring core, means for scribing a plurality of marks upon the tire carcass and means for moving said scribing means into and out of engagement with the said tire carcass.

2. In a tire carcass building machine the combination with a trimming device movable against the tire carcass, of means for scribing a plurality of marks upon the tire carcass, and means for moving said scribing means into and out of engagement with the tire carcass simultaneously with said trimming device.

3. In a tire carcass building machine, a power driven ring core, a pair of marking elements mounted upon said machine and positioned in correct relation in respect to the ring core and means for moving said marking elements into and out of engagement with the tire carcass while mounted on said ring core.

4. In a tire carcass building machine provided with trimming mechanism, a pair of marking elements mounted upon the triming mechanism and adapted to be moved into and out of engagement with the tire carcass simultaneously with said trimming mechanism.

5. In a tire carcass building machine provided with trimming mechanism, of a plurality of adjustably mounted spring-pressed styli mounted upon the trimming mechanism and on the opposite sides of the tire carcass in correct relation thereto, and adapted to be moved into and out of engagement with the said tire carcass simultaneously with said trimming mechanism.

6. In a tire carcass building machine provided with a trimming device movable relatively to the tire carcass, a pair of marking elements mounted upon the said tire machine and on the opposite sides of the tire carcass, said marking elements being mounted adjustably with respect to each other and radially to the core and adapted to be moved into and out of engagement with the tire carcass simultaneously with said trimming device.

7. In a tire carcass building machine provided with a trimming device movable relatively to the tire carcass, means carried by said trimming device for marking the tire carcass.

8. Means for marking a rotatably arranged tire carcass, comprising marking units disposed at one side of the tire carcass, and means to move said marking units into contact with said tire carcass.

9. Means for marking a rotatably arranged tire carcass, comprising a frame provided with a slot, marking units adjustably arranged in said slot, and means to operate said frame to move said marking units into contact with said tire carcass.

10. Means for marking a rotatably arranged tire carcass, comprising a frame provided with a slot, relatively adjustable spring-pressed marking styli arranged in said slot, and means to operate said frame to move said marking styli into contact with the tire carcass.

In testimony whereof, I have signed my name in the presence of two subscribing witnesses.

WILLIAM B. HARSEL.

Witnesses:
R. S. TROGNER,
B. J. McDANEL.